(12) United States Patent
Wu

(10) Patent No.: US 9,341,889 B2
(45) Date of Patent: May 17, 2016

(54) CURVED BACKLIGHT MODULE AND CURVED LCD DEVICE

(71) Applicant: Shenzhen China Star Optoelectronics Technology Co., Ltd., Shenzhen, Guangdong (CN)

(72) Inventor: Chuan Wu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 81 days.

(21) Appl. No.: 14/399,931

(22) PCT Filed: Sep. 11, 2014

(86) PCT No.: PCT/CN2014/086288
§ 371 (c)(1),
(2) Date: Nov. 7, 2014

(87) PCT Pub. No.: WO2016/026185
PCT Pub. Date: Feb. 25, 2016

(65) Prior Publication Data
US 2016/0077380 A1    Mar. 17, 2016

(30) Foreign Application Priority Data

Aug. 21, 2014 (CN) .......................... 2014 1 0416018

(51) Int. Cl.
*G02F 1/1335*    (2006.01)

(52) U.S. Cl.
CPC .................. *G02F 1/133606* (2013.01); *G02F 2001/133607* (2013.01)

(58) Field of Classification Search
CPC .................. G02F 1/133615; G02F 1/133603; G02F 1/133604; G02F 1/133608; G02F 2001/133607; G02B 6/0038; G02B 6/0053
USPC ..................................................... 349/62, 61
See application file for complete search history.

(56) References Cited

U.S. PATENT DOCUMENTS

| | | | |
|---|---|---|---|
| 2008/0198594 A1* | 8/2008 | Lee ..................... | G02B 19/0028 362/231 |
| 2009/0046470 A1* | 2/2009 | Lai ....................... | G02B 6/0021 362/311.01 |
| 2009/0059126 A1* | 3/2009 | Koganezawa ..... | G02F 1/133611 349/64 |
| 2009/0059563 A1* | 3/2009 | Takata ............... | G02F 1/133606 362/97.1 |
| 2010/0002466 A1* | 1/2010 | Kim ........................ | G02B 6/003 362/615 |
| 2014/0092356 A1* | 4/2014 | Ahn ....................... | G02F 1/1339 349/153 |
| 2015/0253623 A1* | 9/2015 | Lee .................... | G02F 1/133603 349/64 |
| 2016/0044776 A1* | 2/2016 | Park ..................... | H05K 1/0274 362/97.1 |

FOREIGN PATENT DOCUMENTS

KR           101329790 B    11/2013

* cited by examiner

*Primary Examiner* — Mike Qi
(74) *Attorney, Agent, or Firm* — Andrew C. Cheng

(57) ABSTRACT

A curved backlight module comprises a light emitting module which is curved shape and a light conversion module which is curved shape and arranged in opposite to the light emitting components, where the light conversion module transform the light from the light emitting module into the parallel light. Also, a curved LCD device having the curved backlight module is disclosed. The uniform illustration of the curved LCD panel can be improved and the shadow region appeared in the two side of the curved LCD panel is eliminated for improving the display quality of the curved LCD panel.

18 Claims, 2 Drawing Sheets

CURVED BACKLIGHT MODULE AND CURVED LCD DEVICE

FIELD OF THE INVENTION

The present invention relates to the technology field of LCDs; in particular, it relates to the curved backlight module and the curved LCD device.

BACKGROUND OF THE INVENTION

With the evolution of optoelectronics and semiconductor technology, it also brings the flourish of the flat panel display. In such many flat panel displays, liquid crystal display becomes the main product of the display market because it owns many superior characteristics of high space utilization efficiency, low power consumption, no radiation and low electromagnetic interference.

The liquid crystal display device usually comprises a liquid crystal panel and a backlight module. Because the liquid crystal display does not have emission function, the back light module is assembled under the liquid crystal panel to provide the liquid crystal panel with the surface light source. Hence, the liquid crystal panel can show images via the surface light source from backlight module.

In resent years, the major manufacturers have launched a curved LCD device. The curved LCD device, as a whole, provides the best visual experience between one screen edge and the other screen edge; however, the screen edge of the common flat LCD device is not always perfect. The whole screen of the curved LCD device has the curved design to surround toward the user to provide the effect of a wide panoramic image. Whether the user stays in front of the middle of screen or around the edge of screen, it brings the same visual experience to the user. Moreover, the distortion of off-axis viewing is reduced when the viewing distance is close. Besides, the curved LCD device will elongate the user's viewing distance to provide the better visual experience.

In the curved LCD devices today, the most models adopt the edge type curved backlight module to provide light to the curved LCD panel. However, the light guide plate of the edge type curved backlight module will curve. It influences the light propagation direction does not match with the optical structure of the bending light guide plate, so the curved LCD panel has the uneven illumination phenomenon. Besides, the shadow appears in the two side region of the curved LCD device to seriously influence the display quality.

SUMMARY OF THE INVENTION

In order to solve the problem existing in the prior art, the aim of the present invention is that a curved backlight module comprises light emitting module which is curved shape and a curved light conversion module which is curved shape and arranged in opposite to the light emitting module, where the light conversion module transform the light from the light emitting module into the parallel light.

Further, the light emitting module comprises a plurality of point light sources which are arranged in curved shape, and the light conversion module comprises a plurality of parallel light conversion components, wherein the parallel light conversion components transform light from the point light source into parallel light.

Further, the parallel light conversion component is a lens having positive refractive power.

Further, the parallel light conversion component is a lens having positive refractive power.

Further, a first surface and a second surface of the lens are convex.

Further, a first surface of the lens is convex and a second surface of the lens is flat.

Further, a first surface of the lens is flat and a second surface of the lens is convex.

Further, at least one surface of a first surface and a second surface of the lens is aspherical.

Further, the lens is made of plastic.

The other aim of the present invention is to provide a curved LCD device, comprising a curved backlight module and a curved LCD panel arranged in opposite to the curved backlight module. The curved backlight module provides light for the curved LCD panel, such that the curved LCD panel shows images, where the curved backlight module is the above mentioned curved backlight module.

The present invention can enhance the uniform illustration of the curved LCD panel. Moreover, the shadow in the two side region of the curved LCD device can be eliminated to improve the display quality of the curved LCD panel.

BRIEF DESCRIPTION OF THE DRAWINGS

Combining with the figures and the bellow detailed description, the characteristics and advantages of the embodiment of the present invention will be explained more clearly. The figures are.

DETAILED DESCRIPTION OF THE PREFERRED EMBODIMENTS

In the following paragraph, the embodiments of the present invention are described detail with reference to the figures. However, there can be various embodiments to achieve the present invention, rather than to limit the scope of the presentation. In contract, the embodiments were chosen and described in order to explain the principles of the disclosure and their practical application so as to activate others skilled in the art to utilize the disclosure and various embodiments and with various modifications as are suited to the particular use contemplated. In the figures, the same mark represents the same element.

It can be understood that these elements should not be limited even though they are described by using the term "first" and "second". These terms are only used to distinguish one element from the other element.

The First Embodiment

Figure 1:
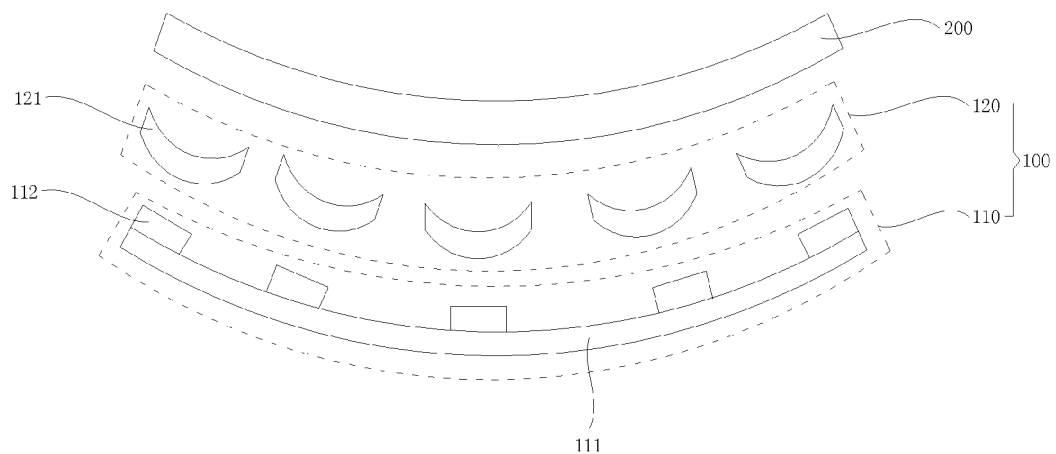
FIG. 1 is the schematic diagram of the curved LCD device according to the first embodiment of the present invention.

FIG. 1 is the schematic diagram of the curved liquid crystal display device according to the first embodiment of the present invention.

Refer to FIG. 1. According to the first embodiment of the present invention, the curved LCD device comprises a curved backlight module 100 and a curved LCD device panel 200 installed in opposite to the curved backlight module 100, where the curved backlight module 100 provides uniform light source which the flat display needs to the curved liquid crystal display panel 200, such that the curved LCD panel shows the images. In the first embodiment, because the specific structure of the curved LCD panel 200 is almost same as one of the curved LCD panel in the prior art, the detailed explanation is not described here.

In the following paragraph, the curved backlight module 100 will be described according to the curved backlight module 100 of the first embodiment of the present invention.

According to the first embodiment of the present invention, the curved backlight module 100 comprise a light emitting module 110 which is curved shape, and the light conversion module 120 which is curved shape, where the light conversion module 120 transforms the light from the light emitting module 110 into the uniform parallel light (or surface light), and provide the parallel light to the curved LCD panel 200 to improve the uniform illustration of the curved LCD panel 200. Besides, the curved backlight module 100 of the first embodiment of the present invention further comprises other optical components, e.g. the optical films, for improving the uniform parallel light transformed by the light conversion module 120 and the fixed components, which are not described detailed for short.

The light emitting module 110 comprises a back plate 111 and several point light sources 112, where a plurality of point light sources 112 are arranged in the curved shape and disposed on the back plate 111. The point light sources 112 can be LEDs, but the scope of the present invention is not limited in the scope of the above description. The light conversion module 120 comprises a plurality of parallel light conversion components 121, which the parallel light conversion components 121 are arranged in the curved shape. The amount of the parallel light conversion components 121 is same as one of the point light sources. In other words, the parallel light conversion components are positioned in opposite to the point light sources 112. Each of the parallel light conversion components 121 can be fixed by the suitable way and be disposed in opposite to the corresponding point light sources 112, such that the present invention enhances the brightness of the most light sources 112 through increasing brightness of part of the point light sources 112. (The part of the point light sources 112 corresponds to the shadow region easily appeared in the curved LCD panel 200.) Therefore, the shadow appeared in the two sides region of the curved LCD panel 200 is eliminated then to improve the display quality of the curved LCD panel 200.

The parallel light conversion components 121 can be lenses having positive refractive power, but the scope of the present invention is not limited in the scope of the above description. The parallel light conversion components 121 can be other type of the elements which transform the incident light into the parallel light. If there is appropriate distance between each of the point light sources 112 and the corresponding lenses, the lenses can transform the light generated from corresponding point light source 112 into the parallel light. For example, each of the point light sources 112 is located in the focus point of the corresponding lens. It is should be paid attention that the first surface of each of the lenses means the lens surface faced toward the corresponding point light source 112 and the second surface of each of the lenses means the lens surface faced toward the curved LCD panel 200.

The first surface of the lens can be convex and the second surface of the lens can be concave. For example, each of the lenses can have a convex moon shape, which faces to the corresponding point light source 112. At least one surface of the lens having the first and second surface can be aspherical. For example, the two faces of each of the lenses can be aspherical. Each of the lenses is made of the material with high light transmittance and high workability. For example, each of the lenses can be made of plastic, but the present invention is not limited in the plastic material. For example, each of the lenses can be made of glass.

The Second Embodiment

Figure 2:
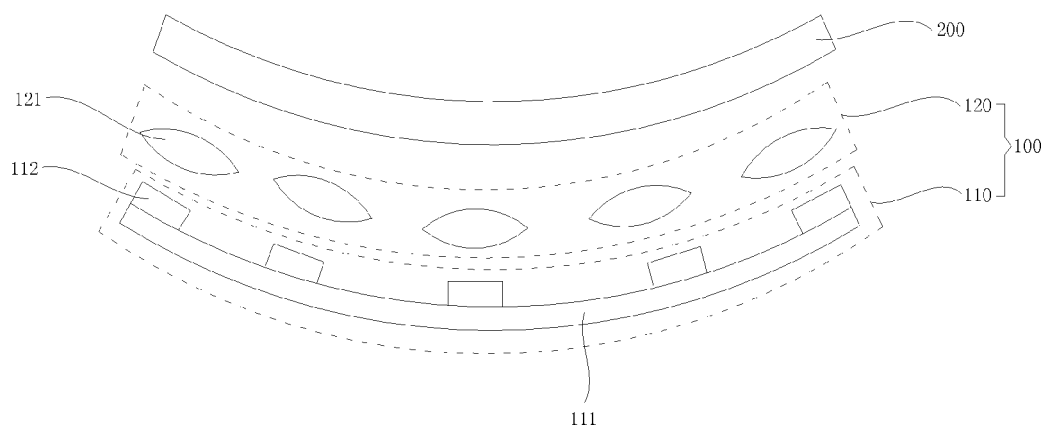
FIG. 2 is the schematic diagram of the curved LCD device according to the second embodiment of the present invention.

FIG. 2 is the schematic diagram of the curved LCD device according to the second embodiment of the present invention.

In the description of the second embodiment, it is not narrated again if the second embodiment has the same feature as the first embodiment. Only the difference comparing with the first embodiment will be narrated. Refer to FIG. 2. The difference of the first and second embodiment is that the parallel light conversion components 121 can be lenses having positive refractive power; however, the present invention cannot be limited thereto. The parallel light conversion components 121 can also be the other types of the elements transforming the incident light into the parallel light. If there is appropriate distance between each of the point light sources 112 and the corresponding lens, the lens can transform the light generated from corresponding point light source 112 into the parallel light. For example, each of the point light sources 112 is located in the focus point of the corresponding lens. It is should be paid attention that the first surface of each of the lenses means the lens surface faced toward the corresponding point light source 112 and the second surface of each of the lenses means the lens surface faced toward the curved LCD panel 200.

Each lens has two surfaces (i.e. the first surface and the second surface) which can be convex. At least one of the first surface and the second surface of each lens can be aspherical. For example, the two surfaces of each of the lenses can both be aspherical. Each of the lenses is made of the material having high light transmittance and high workability. For example, each of the lenses can be made of plastic, but the present invention is not limited in the plastic material. For example, each of the lenses can be made of glass.

The Third Embodiment

Figure 3:
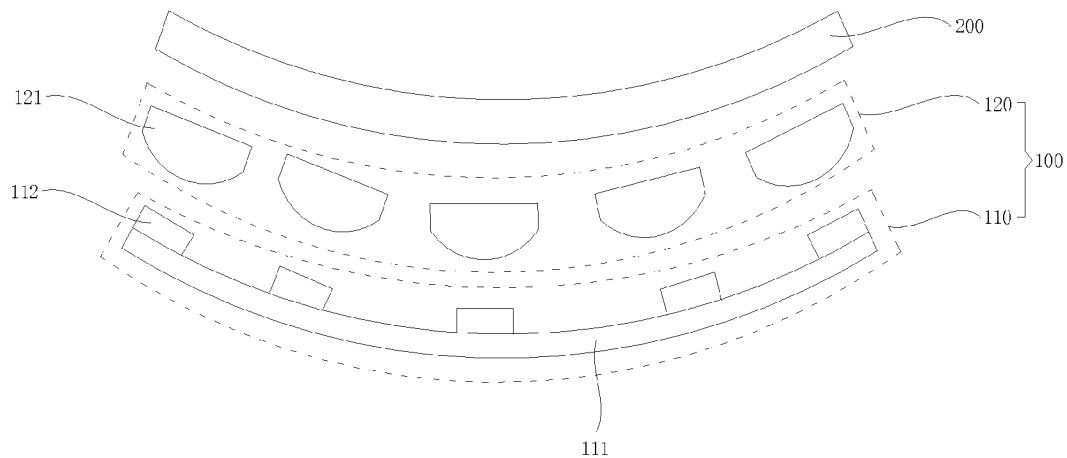
FIG. 3 is the schematic diagram of the curved LCD device according to the third embodiment of the present invention.

FIG. 3 is the schematic diagram of the curved LCD device according to the third embodiment of the present invention.

In the description of the third embodiment, it is not narrated again if the second embodiment has the same feature as the first embodiment. Only the difference comparing with the first embodiment will be narrated. Refer to FIG. 3. The difference between the first embodiment and the third embodiment is that the parallel light conversion components 121 can be lenses having positive refractive power; however, the present invention cannot be limited thereto. The parallel light conversion components 121 can also be the other types of the elements transforming the incident light into the parallel light. If there is appropriate distance between each of the point light sources 112 and the corresponding lens, the lens can transform the light generated from the corresponding point light source 112 into the parallel light. For example, each of the point light sources 112 is located in the focus point of the corresponding lens. It is should be paid attention that the first surface of each of the lenses is the lens surface faced toward the corresponding point light source 112 and the second surface of each of the lenses is the lens surface faced toward the curved LCD panel 200.

The first surface of each of the lenses is convex and the second surface of each of the lenses is flat. For example, each of the lenses is the piano-convex shape of the protrusion faced toward the correspondingly point light source 112. At least one of the first surface and the second surface of each lens can be aspherical. For example, the two surfaces of each of the lenses can be both aspherical. Each of the lenses is made of the material having high light transmittance and high workability. For example, each of the lenses can be made of plastic, but the present invention is not limited in the material of plastic. For example, each of the lenses can be made of glass.

The Fourth Embodiment

Figure 4:
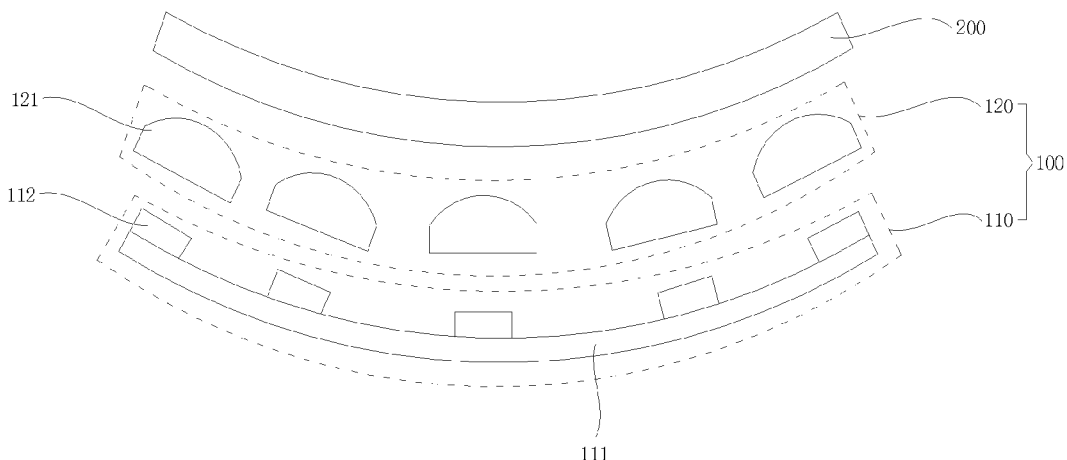
FIG. 4 is the schematic diagram of the curved LCD device according to the fourth embodiment of the present invention.

FIG. 4 is the schematic diagram of the curved LCD device according to the fourth embodiment of the present invention.

In the description of the fourth embodiment, it is not narrated again if the second embodiment has the same feature as the first embodiment. Only the difference comparing with the first embodiment will be narrated. Refer to FIG. 4. The difference between the first embodiment and the third embodiment is that the parallel light conversion components 121 can be lenses having positive refractive power; however, the present invention cannot be limited thereto. The parallel light conversion components 121 can also be the other types of the elements transforming the incident light into the parallel light. If there is appropriate distance between each of the point light sources 112 and the corresponding lens, the lens can transform the light generated from the corresponding point light source 112 into the parallel light. For example, each of the point light sources 112 is located in the focus point of the corresponding lens. It is should be paid attention that the first surface of each of the lenses means the lens surface faced toward the corresponding point light source 112 and the second surface of each of the lenses means the lens surface faced toward the curved LCD panel 200.

The first surface of each of lenses is flat and the second surface is convex. For example, each of the lenses is the plano-convex shape of the protrusion faced toward the correspondingly point light source 112. At least one of the first surface and the second surface of each lens can be aspherical. For example, the two surfaces of each of the lenses can be both aspherical. Each of the lenses is made of the material having high light transmittance and high workability. For example, each of the lenses can be made of plastic, but the present invention is not limited in the material of plastic. For example, each of the lenses can be made of glass.

In summary, according to the embodiments of the present invention, the brightness uniform of the curve LCD panel can be improved. Moreover, the shadow in the two side region of the curved LCD device can be eliminated to improve the display quality of the curved LCD panel.

The foregoing preferred embodiments of the present invention are illustrative, rather than limiting, of the present invention. It is intended that they cover various modifications, and similar arrangements be included within the spirit and scope of the appended claims, the scope of which should be accorded the broadest interpretation so as to encompass all such modifications and similar structures.

What is claimed is:

1. A curved backlight module comprising a curved light emitting module and a curved light conversion module disposed in opposite to the curved light emitting module, wherein the curved light conversion module transforms light from the light emitting module into surface light.

2. The curved backlight module as claimed in claim 1, wherein the light emitting module comprises a plurality of point light sources which are arranged in curved shape, and the light conversion module comprises a plurality of parallel light conversion components, wherein the parallel light conversion components transform light from the point light source into parallel light.

3. The curved backlight module as claimed in claim 2, wherein the parallel light conversion component is a lens having positive refractive power.

4. The curved backlight module as claimed in claim 3, wherein a first surface of the lens is convex and a second surface of the lens is concave.

5. The curved backlight module as claimed in claim 3, wherein a first surface and a second surface of the lens are convex.

6. The curved backlight module as claimed in claim 3, wherein a first surface of the lens is convex and a second surface of the lens is flat.

7. The curved backlight module as claimed in claim 3, wherein a first surface of the lens is flat and a second surface of the lens is convex.

8. The curved backlight module as claimed in claim 3, wherein at least one surface of a first surface and a second surface of the lens is aspherical.

9. The curved backlight module as claimed in claim 3, wherein the lens is made of plastic.

10. A curved LCD device comprising a curved backlight module and a curved LCD panel installed in opposite to the curved backlight module, and the curved backlight module provides light source to the curved LCD panel which the images are shown on, wherein the curved backlight module comprises a curved light emitting module and a curved light conversion module disposed in opposite to the curved light emitting module, wherein the light conversion module transforms light from the light emitting module into parallel light.

11. The curved LCD device as claimed in claim 10, wherein the light emitting component comprises a plurality of point light sources which are arranged in curved shape, and the light conversion module comprises a plurality of parallel light conversion components, wherein the parallel light conversion components transform light from the point light source into parallel light.

12. The curved LCD device as claimed in claim 11, wherein the parallel light conversion component is a lens having positive refractive power.

13. The curved LCD device as claimed in claim 12, wherein a first surface of the lens is convex and a second surface of the lens is concave.

14. The curved LCD device as claimed in claim 12, wherein a first surface and a second surface of the lens are convex.

15. The curved LCD device as claimed in claim 12, wherein a first surface of the lens is convex and a second surface of the lens is flat.

16. The curved LCD device as claimed in claim 12, wherein a first surface of the lens is flat and a second surface of the lens is convex.

17. The curved LCD device as claimed in claim 12, wherein at least one surface of a first surface and a second surface of the lens is aspherical.

18. The curved LCD device as claimed in claim 12, wherein the lens is made of plastic.

* * * * *